United States Patent [19]
Johnson et al.

[11] Patent Number: 5,167,995
[45] Date of Patent: Dec. 1, 1992

[54] LOW TEMPERATURE SHOCK RESISTANT RELEASE LINER

[75] Inventors: Michael A. Johnson; Milton R. Gates; Norihito Shibahara, all of St. Paul, Minn.

[73] Assignee: Minnesota Mining and Manufacturing Company, St. Paul, Minn.

[21] Appl. No.: 535,731

[22] Filed: Jun. 8, 1990

[51] Int. Cl.$^5$ .................................. E04K 15/16
[52] U.S. Cl. .................................. 428/40; 428/308.4; 428/317.1; 428/318.4; 428/511
[58] Field of Search ............... 428/352, 246, 253, 287, 428/336, 511, 520, 308.4, 317.1, 317.3, 318.4, 40, 41, 42

[56] References Cited

U.S. PATENT DOCUMENTS

| | | | |
|---|---|---|---|
| 2,292,024 | 7/1940 | Dreher | 428/317.3 |
| 3,516,842 | 6/1970 | Klinker, Jr. et al. | 117/3.4 |
| 3,933,702 | 1/1976 | Caimi et al. | 260/17 |
| 4,299,741 | 11/1981 | Doehnert | 260/17.4 CL |
| 4,342,815 | 8/1982 | Doehnert | 428/522 |
| 4,426,422 | 1/1984 | Daniels | 428/352 |
| 4,442,129 | 4/1984 | Niwa et al. | 426/399 |
| 4,513,059 | 4/1985 | Dabroski | 428/355 |
| 4,536,434 | 8/1985 | Magnotta | 428/200 |
| 4,555,436 | 11/1985 | Geurtsen et al. | 428/200 |
| 4,564,550 | 1/1986 | Tschudin-Mahrer | 428/159 |
| 4,581,266 | 4/1986 | Magnotta | 428/40 |
| 4,645,537 | 2/1987 | Gardenier et al. | 106/243 |
| 4,713,273 | 12/1987 | Freedman | 428/40 |
| 4,751,121 | 6/1988 | Kühnel et al. | 428/40 |
| 4,833,010 | 5/1989 | Langley | 428/287 |

FOREIGN PATENT DOCUMENTS

747341 11/1966 Canada .

*Primary Examiner*—Merrell C. Bashion, Jr.
*Assistant Examiner*—D. S. Nakarani
*Attorney, Agent, or Firm*—Gary L. Griswold; Walter N. Kirn; Robert H. Jordan

[57] ABSTRACT

Release liners comprising support sheet and face layer, the face layer comprising one or more of the following: a copolymer of ethylene and at least one polar comonomer, or a copolymer of propylene and at least one polar comonomer, or blends of such copolymers. Such release liners provide low temperature shock resistance and smooth, substantially uniform release characteristics when applied to acrylic pressure-sensitive adhesives.

19 Claims, 1 Drawing Sheet

FIG.1

LOW TEMPERATURE SHOCK RESISTANT RELEASE LINER

FIELD OF INVENTION

The present invention relates to release liners for acrylic pressure-sensitive adhesive articles, and particularly to release liners which exhibit low temperature shock resistance and smooth, substantially uniform release characteristics.

BACKGROUND

Currently, many tapes and other pressure-sensitive adhesive-coated articles have a release liner applied to the adhesive during or following manufacture. The release liner is typically left in place while the article is laminated, converted, packaged, and shipped to ultimate users, and in many instances is left in place until the article is bonded to an adherend with the pressure-sensitive adhesive. Release liners are often used for one or more of a number of purposes, including for example, preventing contamination of the adhesive layer, facilitating handling of the adhesive-coated article (e.g., by providing support thereto as well as covering the adhesive), identifying the articles to which they are applied, roll stability of articles such as tapes when wound into roll form, etc.

Some common release liners include polyethylene films and silicone-coated papers. A problem with conventional liners when used with acrylic-based pressure-sensitive adhesive layers is that the liners are frequently subject to undesirable pop-off if stretched during handling of the article or if shocked, especially at low temperatures. Also, in some instances, it is feared that silicone materials may contaminate the adhesive coatings or the substrate. For example, silicone materials which are deposited on the surface of an automobile body panel may interfere with proper adhesion of paints thereto.

SUMMARY OF INVENTION

The present invention provides release liners for use with articles having layers of acrylic-based pressure-sensitive adhesives. The release liners provided herein provide surprising low temperature shock resistance to pop-off coupled with smooth, substantially uniform release characteristics. The release liners provided herein may be made with relatively inexpensive materials, thereby achieving cost advantages over conventional release materials such as silicones.

In brief summary, release liners of the invention each comprise (1) a support sheet having two major surfaces and (2) a face layer on one of the major surfaces of the support sheet that is substantially continuous and comprises one or more of the following: a copolymer of ethylene and at least one polar comonomer, or a copolymer of propylene and at least one polar comonomer, or blends of such copolymers. The face layer and support sheet are typically substantially coextensive over at least that portion of the liner which is contacted to the adhesive coated portion of the article to which the liner is applied.

Release liners of the invention can provide effective protection against contamination of an underlying adhesive layer, can be used to provide support to adhesive-coated articles, e.g., adhesive tapes, during fabrication, conversion, storage, shipment, and application thereof, and can impart greater roll stability to many rolled articles such as adhesive tapes. Release liners of the invention may be made in very thin form if desired as well as in embodiments with distinctive appearance so as to provide means for identifying articles to which they are applied.

BRIEF DESCRIPTION OF DRAWING

The invention will be further explained with reference to the drawing, wherein.

This FIGURE, which is idealized, is not to scale and is intended to be merely illustrative and non-limiting.

DETAILED DESCRIPTION OF ILLUSTRATIVE EMBODIMENTS

Figure 1:
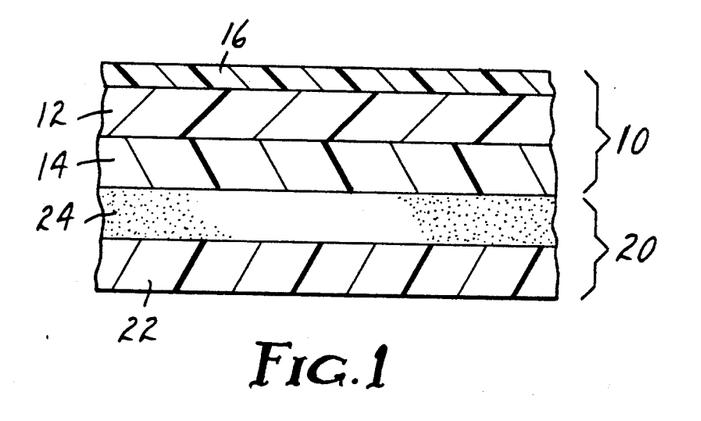
FIG. 1 is a cross-section of a portion of an illustrative release liner of the invention shown applied to a tape having a pressure-sensitive adhesive coating.

A typical embodiment of release liner of the invention is illustrated in FIG. 1. Release liner 10 comprises support sheet 12 and face layer 14, and optional friction-enhancing layer 16. A typical application for release liners of the invention is on adhesive tapes coated with pressure-sensitive adhesive, particularly acrylic-based adhesives. Release liner 10 is shown applied to adhesive tape 20 which comprises tape support 22 and adhesive layer 24. Adhesive layer 24 comprises an acrylic pressure-sensitive adhesive.

Support sheet 12 typically substantially defines the overall strength characteristics, e.g., secant modulus, tear strength, flexibility, extensibility, tensile strength, etc., of release liner 10. During fabrication of release liner 10, support 12 should be able to withstand the stresses necessary for formation of face layer 14 thereon. Further, a typical application of release liners 10 of the invention is on adhesive tapes and articles wherein release liners 10 may be subjected to substantial stresses, for instance when drawn through processing equipment during fabrication of an adhesive tape, during storage and shipment of the tape, or during application of the tape to a substrate.

In many instances, support sheet 12 will preferably provide, without breaking, a tensile force of at least about 0.2, typically more preferably at least about 0.5, pound/inch-width at a strain or elongation of about 1 percent. Depending upon the application for which the release liner is being prepared, support sheets which provide lower tensile forces may be useful or support sheets which provide higher tensile forces may be desirable.

Typically, a release liner will be subjected to tensile stresses during use and it will be desired for the liner to elongate to some extent. In many embodiments of the invention, it will be preferred that the support sheet have an elongation of at least about 5 percent, i.e., it can be elongated to that extent without breaking. In some other embodiments, support sheet 12 will more preferably have an elongation of at least about 10 percent, or even at least about 20 percent. Desired elongation for a particular embodiment of release liners of the invention will be substantially dependent upon the intended application.

It is preferred, however, that the support sheet retain sufficient structural integrity to impart dimensional stability to the release liner and, for example, the adhesive-coated article, when it is elongated. For instance, in applications where release liners of the invention are used on foam-like adhesive tapes such as are used on weather stripping and body side moldings for automobiles, it may be preferred that the support sheet have a tensile force of at least about 2 pounds/inch-width at an elongation of about 20 percent.

Support sheet 12 is preferably at most lowly elastic, and it is more preferably substantially non-elastic such that when the release liner is stretched and the tensile forces released, it will not tend to recover and cause curling of 14 face layer or adhesive-coated article 20.

Support sheet 12 may be a substantially continuous film, e.g., an extruded or solvent coated film, or may be a web, e.g., a non-woven, knit, woven, or other web, that has one or more holes and perforations therein. An advantage of support sheets having holes and perforations therein is that the polymeric material of the face layer may penetrate into, and in some instances penetrate substantially through and saturate, the web. Such penetration typically results in mechanical fastening of support sheet 12 and face layer 14, providing a firmer bond therebetween than is provided by interfacial adhesion alone. The resultant release liner thus exhibits greater resistance to delamination with easier startability of removal typically being provided.

Non-woven materials are preferred because they typically tend to be dimensionally deformable to a limited degree, but tend to resist yielding at low loads, such that the release liner will remain securely bonded to the adhesive layer when small stresses are applied thereto. For instance, non-woven webs providing a force of at least about 2 pounds/inch-width at an elongation of about 20 percent are useful as support sheets in release liners of the invention for many applications. Typically, as the basis weight of non-woven webs is increased the force they provide at a specified strain or elongation increases. Thus, non-woven webs may be easily formulated to provide support sheets for liners of the invention having desired properties. Illustrative examples of non-woven webs which may be used herein include spun-bonded, point-bonded, air-laid, dry-laid, wet-laid, thermally-bonded, and resin-bonded webs.

Support sheet 12 is typically between about 2 and about 15 mils (50 and 375 microns) thick. It will be understood that support sheets having thicknesses outside this range may be used, however, those which are excessively thin may tend to provide insufficient strength and thus be subject to structural failure, e.g., tearing or splitting whereas those which are excessively thick may tend to be undesirably stiff.

Some illustrative examples of materials that support sheets may be made from include one or more of the following: nylon, polypropylene, polyethylene, polyester, acrylic, cellulosic derivative (e.g., cotton fabric, rayon, acetates, or butyrates), etc.

Preferably, the release liner is free of agents which tend to impair performance of the adhesive coating to which they are applied. For instance, many plasticizers may undesirably affect the adhesion properties of pressure-sensitive adhesives. Also, agents such as silicones may interfere with the adhesive coatings or may contaminate substrates, e.g., automobile body parts that are to be painted. Accordingly, support sheet 12 is substantially free of migratory plasticizers and silicones to avoid adverse interaction with the pressure-sensitive adhesive layer to which the release liner is contacted.

Face layer 14 imparts to release liner 10 desired surface adhesion and release characteristics with regard to adhesive coatings to which the liner is to be applied. Preferably, face layer 14 is substantially continuous such that support sheet 12 will not contact the adhesive coating 24 on article 20 to which liner 10 is to be applied.

Face layer 14 typically comprises and may consist essentially of one or more of the following: a copolymer of ethylene and at least one polar comonomer, i.e., a comonomer which has a higher surface energy than does polyethylene, or a copolymer of propylene and at least one polar comonomer, or blends thereof.

Some illustrative examples of copolymers that may be used in face layers of release liners of the invention include copolymers of ethylene with any of methylmethacrylate, methylacrylate, ethylacrylate, acrylic acid, methacrylate, butyl acrylate, vinyl acetate, or maleic anhydride. Copolymers of propylene with such materials may also be used. For applications wherein shock resistance at very low temperatures, e.g., below $-20°$ C., copolymers of ethylene are preferred as they typically exhibit greater shock resistance at low temperature.

A preferred embodiment which provides excellent very low temperature shock resistance and elongates with low stress to a limited degree below about 5 percent elongation and exhibits substantial resistance to stretching at higher elongations, thereby providing high tendency to remain securely laminated to a substrate, e.g., tape, during handling, etc., and also providing dimensional support during conversion (e.g., lamination, slitting, etc.) and facilitating removal, is a release liner comprising a support sheet made from a spun-bonded web of nylon-6,6 having a basis weight of about 1 ounce/yard$^2$ with a face layer about 3 mils in thickness and consisting of ethylene/vinyl acetate copolymer (28 weight percent vinyl acetate). Many such webs and copolymers are commercially available.

As shown in FIG. 1, in some instances, release liners 10 of the invention may further comprise optional friction-enhancing agent 16 on the major surface of support sheet 12 opposite the major surface on which face layer 14 is disposed. In applications where the release liner is to be used on an adhesive-coated article such as dual-functional or double sided adhesive tape, e.g., coated with a pressure-sensitive adhesive on one side and a heat-activated adhesive on the other side, which is wound into roll form, the back surface of support sheet 12 will be wound into contact with the heat-activated adhesive-coated side of the tape. If the support sheet and tape exhibit low friction, they may tend to move freely, resulting in poor roll stability. In such instances, it may be desired to select support sheet 12 from materials as described above which inherently exhibit desired friction with the tape, or to treat support sheet 12 to increase friction to desired levels, e.g., by applying friction-enhancing agent 16 thereto. Such agent may be applied in the form of a substantially continuous layer or may be selectively applied in pattern form. Illustrative examples of such agents include ethylene/acrylic acid mixtures containing tackifiers which provide improved performance when applied to polyethylene support sheets for use on release liners used with tapes with back sides made of olefin-based very low tack heat-activated adhesives.

Release liners of the invention may be made in substantially opaque embodiments or may be made in at least partially light transmissive embodiments, e.g., premasks. Partially light transmissive embodiments may be used to facilitate application, e.g., registration, of the liner or handling of the liner and/or articles to which it is attached. An illustrative example of such embodiment is a substantially clear ethylene/vinyl acetate face layer on a CEREX Brand nylon support sheet. Release liners may be colored, e.g., by incorporating coloring agents such as pigments and dyes, preferably non-migratory, therein. Such coloring may be used to differentiate release liner or adhesive-coated article embodiments and other purposes.

As mentioned above, one of the unexpected advantages of release liners of the present invention is that they provide smooth, substantially uniform release characteristics, i.e., the interaction with the pressure-sensitive adhesive is such that the force required to remove the liner therefrom remains substantially constant over a wide range of separation or removal rates. For instance, some release liners of the invention have been observed to provide a release force of about 1.5 pounds/inch-width when removed from pressure-sensitive adhesive coating at a rate of about 12 inches/minute and to provide a substantially equal release force of about 1.4 pounds/inch-width when removed from the same adhesive coating at a rate of about 90 inches/minute. Contrarily, polyethylene release liners were observed to provide release forces of about 2.0 and 0.2 pounds/inch-width, respectively. The tendency of release liners of the invention to exhibit substantially equal release forces over a wide range of separation rates is indicative in part of cold temperature shock resistance, particularly under conditions wherein the liner and article to which it is attached are subjected to short term but potentially substantial stresses.

Another unexpected advantage of release liners of the invention that has been observed is that the initial adhesion of some adhesives is increased by using release liners of the invention. It has been observed that the proportion of ester functionality at the surface of bicomponent acrylic pressure-sensitive adhesives is increased when release liners of the invention having ethylene/vinyl acetate face layers are used. While we do not wish to be bound by this theory, it is believed that the increased ester functionality is a transient shift within the pressure-sensitive adhesive layer that results in slightly tackier surface to the adhesive coating, thereby providing increased initial adhesion for bonding the adhesive-coated article to a substrate.

EXAMPLES

The invention will be further explained by the following illustrative examples which are intended to be nonlimiting. Unless otherwise indicated, all amounts are expressed in parts by weight.

Unless otherwise indicated, the following abbreviations are used in the Examples:

| Abbreviation | Meaning |
|---|---|
| cm | centimeter |
| mm | millimeter |
| oz | ounce |
| AA | acrylic acid |
| EAA | ethyl acrylic acid |
| EEAMAH | ethylene ethylacrylate maleic anhydride |
| EVA | ethylene vinyl acetate |
| MMA | methyl methacrylate |

Unless otherwise indicated, the following test procedures were used in the Examples.

Release Force

A sample is prepared by laminating the release side or surface, i.e., the face layer, of the subject liner to an adhesive tape and cutting out a 1 inch×7 inch (2.5 cm×17.5 cm) strip. The liner is pulled away from the adhesive tape for a distance of about 4 inches (10 cm) on an Instron or equivalent tester at an angle of 180 degrees and a crosshead speed of 12 inches/minute (30 cm/minute) and the force required to do so measured.

Re-adhesion

A sample is prepared by laminating the subject release liner to the adhesive side of a Y-4234 Weatherstrip Attachment Tape, an acrylic foam tape with an acrylic-based pressure-sensitive adhesive on one side and heat-activated adhesive on the other side, available from Minnesota Mining & Manufacturing Company (hereinafter "3M"), and cutting a 1 inch×4 inch (2.5 cm×5 cm) strip. The liner is then removed and the adhesive laminated to cellophane available from DuPont Company. The cellophane is then removed on an Instron or equivalent extension tester at an angle of 180 degrees and a crosshead speed of 12 inches/minute (30 cm/minute) to determine if there has been any contamination of the adhesive. Aging tests can be conducted at room temperature and 158° F. (70° C.).

−40° C. Shock Resistance

A sample is prepared by heat bonding a Y-4234 Weatherstrip Attachment Tape to a 0.5 inch×4 inch×0.125 inch (1.27 cm×10 cm×0.32 cm) anodized aluminum plate. The release surface of the subject liner is then adhered to the pressure-sensitive adhesive side of the tape. Two or more samples are placed in a box which is then placed in a freezer overnight at a temperature of −40° C. After at least 16 hours residence in the freezer, the box is shaken for about one minute, and the sample is observed for pop-off or delamination of the liner.

−40° C. Liner Adhesion

The release surface of a 12 inch×0.5 inch (30 cm×1.25 cm) piece of the subject liner is adhered to the pressure-sensitive adhesive-coated side of a 12 inch×0.5 inch (30 cm×1.25 cm) piece of Y-4234 Weatherstrip Attachment Tape. The exposed side of the tape is then heat bonded to a 12 inch×1 inch (30 cm×2.5 cm) flat EPDM profile extrusion test strip, ethylene propylene diene monomer, thermoset rubber, available from Cooper Rubber Company. The sample is then placed in a −40° C. freezer overnight. Immediately after removal of the test strip from the freezer, the test strip with the liner is held on each end and twisted 180 degrees along the axial length of the sample. If no pop-off of the liner is observed, the test strip is twisted another 180 degrees in the same direction of rotation as the first twist for a total twist of 360 degrees. If no pop-off of the liner is observed, the test strip is untwisted and formed into a circular loop with the liner on the inside of the loop and observed for liner pop-off.

5° C. Shock Resistance

The subject release liner is laminated to a piece of primed weather strip rubber with a 4211 Double-Coated Tape primed with K500 Primer. Both the tape and primer are available from 3M. The sample is conditioned at 5° C. for at least 12 hours. The laminated strips are then placed in a carton. The carton, maintained at a temperature of 5° C., is rotated by a motor and the weather strip is observed for any pop-off or delamination of the liner at 30 minute intervals.

Tensile Force

A 0.5 inch×7 inch (1.27 cm×17.5 cm) sample of the subject release liner is elongated in an Instron or equivalent extension tester with a jaw separation of 5 inches (12.5 cm) and a crosshead speed of 0.5 inch (1.27 cm) per minute. The force, up to 20 percent elongation of the sample, is recorded at specified elongations. The sample is then removed from the jaws, allowed to relax, and the final length measured. The data obtained with this test can be used to calculate the Secant Modulus of release liners.

EXAMPLE 1

A release liner was made by extruding at 350° F. (175° C.) a 3 mil (0.76 mm) thick layer of ELVAX 260, an EVA copolymer having a vinyl acetate content of 28 weight percent and melt index of 6 available from E. I. DuPont De Nemours & Company (hereinafter "DuPont"), onto a 1.0 oz/yard$^2$ (33.8 grams/meter$^2$) CEREX Brand nylon nonwoven available from James River Corporation. The non-woven was not saturated and fibers protruded slightly from the uncoated side.

Samples were tested as described in the −40° C. Shock Resistance Test and the −40° C. Liner Adhesion Test. The samples passed the Shock Resistance Test and all aspects of the Liner Adhesion Test, i.e., the liner remained adhered to the adhesive during a 180 degree twist, a 360 degree twist, and when a circular loop was formed.

EXAMPLE 2

A release liner was made as in Example 1 except that a 1 oz/yard$^2$ (33.8 grams/meter$^2$) CEREX Brand point-bonded nylon non-woven scrim was used instead of the nylon non-woven web.

Samples were tested as in Example 1 and similar results were obtained.

EXAMPLE 3

A release liner was made as in Example 1 except that the EVA used was ELVAX 265 (melt index of 3), available from DuPont, and that the EVA was extruded at the upper limit of its recommended processing temperature of 425° F. (218° C.) so that the non-woven scrim was fully saturated and substantially all of the fibers were coated and adhered to the EVA. The total thickness of the liner was 6 mils (0.15 mm).

Samples were tested as in Example 1 and similar results were obtained. Samples were then tested for tensile force, with the results shown in Table 1. The data show that the sample has less resistance to stretch at 1 and 2 percent elongation than the liner in Comparative Example A, but at 20 percent elongation, the tensile force is greater than the liner in Comparative Example A.

EXAMPLE 4

A release liner was made as in Example 3 but a Point-Bonded CEREX Brand point-bonded nylon nonwoven web was used as in Example 2. The total thickness was 6 mils (0.15 mm).

Samples were tested as in Example 1 and similar results were obtained. Results of the liner's tensile force are shown in Table 1.

EXAMPLE 5

A release liner example was made as in Example 3 except that a 2.0 oz/yard$^2$ (67.6 grams/meter$^2$) CEREX Brand nonwoven was used and the total thickness was 9 mils (0.23 mm).

Samples were tested as in Example 1 and similar results were obtained. Results of the liner's tensile force are shown in Table 1.

EXAMPLE 6

This example was made as in Example 3 except that a 0.5 oz/yard$^2$ (16.9 grams/meter$^2$) CEREX nonwoven was used and the total thickness was 26 mils (0.07 mm).

Samples were tested as in Example 1 and similar results were obtained. Results of the liner's tensile force are shown in Table 1.

COMPARATIVE EXAMPLE A

A release liner was made by co-extruding a 4 mil (0.1 mm) thick polyethylene liner having a construction of 0.7 mil (0.018 mm) high density polyethylene, 2.6 mils (0.07 mm) medium density polyethylene, and 0.7 mil (0.018 mm) low density polyethylene. The high density polyethylene was CHEMPLEX 6109, and the low density polyethylene was NORCHEM 353, both available from Quantum Chemical Corporation. The medium density layer was a 40/60 blend of high and low density polyethylenes, respectively. In this and the other Comparative Examples wherein a multilayer release liner was made, the middle layer was pigmented with PM 3066E1 Orange from Techmer Corporation to facilitate identification of the liners. The pigment is believed to have had no effect on the release properties of the subject liners.

Both the high and low density sides of the laminate were tested as release surfaces and failed the −40° C. Shock Resistance Test and the 180 degree twist phase of the −40° C. Liner Adhesion Test. The results for tensile force are shown in Table 1.

TABLE 1

| Ex. | Tensile Force[1] % Elongation | | | | | | | Final[2] Length |
|---|---|---|---|---|---|---|---|---|
|  | 1% | 2% | 5% | 7.5% | 10% | 15% | 20% |  |
| 3 | 18 | 31 | 55 | 69 | 82 | 107 | 126 | 13.2 |
| 4 | 17 | 30 | 51 | 61 | 70 | 85 | 98 | 13.0 |
| A | 36 | 52 | 74 | 80 | 83 | 84 | 81 | 13.7 |
| 5 | 29 | 52 | 91 | 116 | 134 | 167 | 194 | 13.2 |
| 6 | 9.8 | 13 | 21 | 26 | 29 | 35 | 41 | 13.2 |

[1]Newtons/100 mm-width
[2]centimeters

EXAMPLES 7 AND 8 AND COMPARATIVE EXAMPLE B

Release liners were tested in Examples 7 and 8 and Comparative Example B by laminating the liners made in Examples 3, 4, and Comparative Example A, respectively, to a Y-4243 Weatherstrip Attachment Tape.

The laminates were tested for tensile force. As shown by the results which are tabulated in Table 2, the liners in Examples 7 and 8 show a greater tensile force than does the liner in Comparative Example B and that they thereby limit the elongation and deformation of the Weatherstrip Attachment Tape.

TABLE 2

| Ex. | Tensile Force[1] % Elongation | | | | | | | Final[2] Length |
|---|---|---|---|---|---|---|---|---|
| | 1% | 2% | 5% | 7.5% | 10% | 15% | 20% | |
| 7 | 21 | 36 | 65 | 87 | 98 | 125 | 148 | 13.6 |
| 8 | 15 | 28 | 58 | 74 | 88 | 109 | 126 | 13.4 |
| B | 35 | 53 | 88 | 99 | 107 | 119 | 111 | 13.8 |

[1]Newtons/100 mm-width
[2]centimeters

EXAMPLE 9

A release liner was made by extruding a 3 mil (0.076 mm) thick layer of EXXON No. 720.62 EVA copolymer having a vinyl acetate content of 19 weight percent (available from Exxon Corp.), onto a 4 mil (0.1 mm) thick polyethylene backing as described in Comparative Example A. The EVA was extruded onto the high density side of the liner.

Samples were tested as in Example 1. Similar results were obtained in the −40° C. Shock Resistance Test and the 180 degree and 360 degree twist phases of the −40° C. Liner Adhesion Tests. During the loop phase some slight bridging was observed.

EXAMPLES 10 AND 11 AND COMPARATIVE EXAMPLE C

Samples of the release liner made in Example 9 were laminated to Y-4234 Weatherstrip Attachment Tape at room temperature and at 110° C. for Examples 10 and 11, respectively.

In Comparative Example C, the liner made in Comparative Example A was laminated to Y-4234 Weatherstrip Attachment Tape at room temperature.

The liners were tested for release force from the weatherstrip tape, and re-adhesion at room temperature and at 70° C., after one and six weeks of aging. The results obtained, which are tabulated in Table 3, show that as regards adhesion buildup, release liners of the invention exhibit comparable performance to polyethylene liners, and that as regards re-adhesion, no significant decline of force was observed, indicating no contamination of the adhesive surface.

TABLE 3

| Ex. | T[3] | Release Force[1] | | | | Re-Adhesion[2] | | | |
|---|---|---|---|---|---|---|---|---|---|
| | | RT | | 70° C. | | RT | | 70° C. | |
| | | 1 | 6 | 1 | 6 | 1 | 6 | 1 | 6 |
| 10 | 21 | 230 | 340 | 300 | 390 | 1710 | 2310 | 1950 | 1810 |
| 11 | 110 | 380 | 480 | 260 | 330 | 2290 | 2500 | 2070 | 1960 |
| C | 21 | 830 | 890 | 620 | 650 | 1730 | 2350 | 2000 | 1880 |

[1]In grams/25 mm-width at 1 and 6 weeks.
[2]In grams/25 mm-width at 1 and 6 weeks.
[3]Temperature of lamination in °C.

EXAMPLE 12

A release liner was made by extruding a 1.5 mil (0.038 mm) thick layer of ELVAX 750, an EVA copolymer having a vinyl acetate content of 9 weight percent from DuPont, onto a support sheet. The EVA surface was laminated to a 4205 tape Body Slide Molding Tape, a foam tape with an acrylic-based pressure-sensitive adhesive on each side, from 3M.

Test results are shown in Table 4.

EXAMPLE 13

A release liner was made as in Example 12 except that ELVAX 450, an 18 weight percent vinyl acetate EVA from DuPont, was used.

Test results are shown in Table 4.

EXAMPLE 14

A release liner was made as in Example 12 except that ELVAX 265, a 28 weight percent vinyl acetate EVA from DuPont, was used.

Test results are shown in Table 4.

COMPARATIVE EXAMPLE D

A release liner was prepared by laminating the high density polyethylene surface of the liner made as in Comparative Example A to 4205 foam tape.

The results obtained with such liner are tabulated in Table 4.

EXAMPLES 15–17 AND COMPARATIVE EXAMPLE E

Release liners in Examples 15–17 were made as in Examples 12–14, respectively. The liner in Comparative Example E was made as in Comparative Example D. Each of the liners was laminated to a 5320 foam tape available from 3M.

Test results are shown in Table 4.

EXAMPLES 18–20 AND COMPARATIVE EXAMPLE F

Examples 18–20 and Comparative Example F were made as in Examples 12–14 and Comparative Example D, respectively, and laminating to 9469 transfer tape, an acrylic-based pressure-sensitive adhesive on a liner, from 3M.

Test Results are shown in Table 4.

TABLE 4

| Ex | Tape | In[3] | Release Force[1] | | | | Re-Adhesion[2] | | | |
|---|---|---|---|---|---|---|---|---|---|---|
| | | | RT | | 70° C. | | RT | | 70° C. | |
| | | | 1 | 6 | 1 | 6 | 1 | 6 | 1 | 6 |
| 12 | 4205 | 8.9 | 60 | 220 | 160 | 110 | 2000 | 2020 | 2300 | 2210 |
| 13 | 4205 | 31 | 80 | 60 | 110 | 110 | 2060 | 2280 | 2280 | 2230 |
| 14 | 4205 | 80 | 200 | 180 | 760 | 800 | 2020 | 2220 | 2050 | 2230 |
| D | 4205 | 938 | 950 | 380 | 110 | 90 | 2020 | 2130 | 2230 | 2190 |
| 15 | 5320 | 116 | 310 | 290 | 340 | 180 | 2490 | 2460 | 2610 | 2100 |
| 16 | 5320 | 45 | 170 | 140 | 510 | 170 | 2090 | 1910 | 2100 | 2010 |
| 17 | 5320 | 438 | 770 | 210 | 1070 | 1150 | 1750 | 2050 | 2320 | 2070 |
| E | 5320 | 840 | 1020 | 1060 | 850 | 700 | 2440 | 2150 | 2290 | 2100 |
| 18 | 9469 | 107 | 90 | 140 | 190 | 140 | 1990 | 1940 | 2060 | 2080 |
| 19 | 9469 | 107 | 50 | 60 | 220 | 240 | 1890 | 2020 | 1840 | 2010 |
| 20 | 9469 | 98 | 190 | 140 | 1270 | 1280 | 1930 | 2060 | 1980 | 2020 |

TABLE 4-continued

| | | | Release Force[1] | | | | Re-Adhesion[2] | | | |
| | | | RT | | 70° C. | | RT | | 70° C. | |
| Ex | Tape | In[3] | 1 | 6 | 1 | 6 | 1 | 6 | 1 | 6 |
|---|---|---|---|---|---|---|---|---|---|---|
| F | 9469 | 684 | 760 | 590 | 190 | 160 | 1840 | 2000 | 2060 | 2080 |

[1]In grams/25 mm-width at 1 and 6 weeks.
[2]In grams/25 mm-width at 1 and 6 weeks.
[3]Initial adhesion In grams/25 mm-width.

EXAMPLE 21 AND COMPARATIVE EXAMPLE G

A three layer release liner was made by co-extruding a 4 mil (0.1 mm) thick composite having a 0.5 mil (0.01 mm) thick layer of 18 weight percent vinyl acetate EVA copolymer (Quantum UE631 from Quantum Chemical Corp.), a 3.0 mil (0.075 mm) thick layer of Chemplex 6180 high density polyethylene (available from Quantum Chemical Corp.) in the middle, and a 0.5 mil (0.012 mm) thick layer of a 95/5 blend of Chevron 5755 low density polyethylene from Chevron Chemical Co./10063 Antiblock from Ampacet Corp.

Both the EVA and polyethylene sides of the liner were tested for release force using a 4205 Body Side Molding Attachment Tape. The test was run at 12 inches/minute (30 cm/minute) and 90 inches/minute (225 cm/minute) and results are shown in Table 5. The results of the EVA side are reported as Example 21, and those of the polyethylene side as Comparative Example G.

EXAMPLE 22 AND COMPARATIVE EXAMPLE H

A release liner was made as in Example 21 except that the polyethylene used was DFDA 1137, a very low density polyethylene (VLDPE) from Union Carbide Corp., and the thicknesses of the layers were as follows: EVA layer was 0.1 mil (0.027 mm), HDPE was 3 mils (0.076 mm), and VLDPE was 0.4 mil (0.01 mm).

The results of the EVA side are reported as Example 22, and those of the polyethylene side as Comparative Example H.

TABLE 5

| | Release Force[1] | |
| Ex | Slow | Fast |
|---|---|---|
| 21 (EVA side) | 180 | 170 |
| G (LDPE side) | 350 | 190 |
| 22 (EVA side) | 250 | 340 |
| H (VLDPE side) | 200 | 150 |

[1]Grams/25 mm-width, tested at 30 cm/minute and 230 cm/minute, respectively.

EXAMPLE 23

A release liner was made by co-extruding a 0.125 mm thick film having a layer of 0.020 mm thick ethylene methylmethacrylate (EMMA), a layer of 0.085 mm thick low density polyethylene (B128 from Ube Industries, Ltd.) in the middle, and a layer of 0.020 mm thick F022NH low density polyethylene from Ube Industries, Ltd. The EMMA was CM2005 having a methyl methacrylate (MMA) content of 25 weight percent.

The sample was tested for release force at room temperature and at 5° C., and for the time at which pop-off had occurred at 5° C. Test results are summarized in Table 6.

EXAMPLE 24

A 0.145 mm thick release liner was made by co-extruding a 0.0225 mm thick release layer of WH202, an ethylene methyl methacrylate copolymer having a methyl methacrylate content of 20 weight percent, a 0.100 mm thick layer of a polyethylene blend, and a layer of 0.0225 F022NH low density polyethylene. The polyethylene blend was a 40/60 blend of Hz5000SF and B128.

The liner was tested as in Example 23, and results are summarized in Table 6.

EXAMPLES 25-27

In Examples 25-27, release liners were prepared as in Example 24 with EMMA copolymers having varying methyl methacrylate contents. Example 25 had Hz5000SF as the middle and F022NH as the third layer. Examples 26 and 27 had Hz5000SF as the middle layer and M103 available from Mitsui Petrochemical Industries, Ltd. as the third layer.

The liner was tested as in Example 23, and results are summarized in Table 6.

EXAMPLES 28-31

In Examples 28-31, release liners were prepared as in Example 24 except having the release layer shown in Table 6. These examples show ethylene copolymers having various polar comonomers. The comonomers were acrylic acid (AA), methacrylic acid (MAA), and ethyl acrylate (EA).

The liner was tested as in Example 23, and results are summarized in Table 6.

EXAMPLES 32 AND 33

In Examples 32 and 33, release liners were made as described in Example 24, except that the face layer was ethylene ethylacrylate maleic anhydride. The maleic anhydride was 3 weight percent of the copolymer in both cases, and the ethylacrylate was 12 weight percent and 6 weight percent in examples 32 and 33, respectively.

The liner was tested as in Example 23, and results are summarized in Table 6.

TABLE 6

| Ex | Face Layer[1] | Co-monomer | Amt[2] | Release Force[3] RT | Release Force[3] 5° C. | Pop Off[3] |
|---|---|---|---|---|---|---|
| 23 | CM2005 | MMA | 25 | 90 | 150 | 120 |
| 24 | WH202 | MMA | 20 | 90 | 110 | 90 |
| 25 | CM8014 | MMA | 17.5 | 100 | 130 | 30 |
| 26 | CM8013 | MMA | 12.5 | 110 | 70 | 30 |
| 27 | WD201 | MMA | 10 | 130 | 50 | <30 |
| 28 | A201M | AA | 7 | 360 | 130 | 120 |
| 29 | N0903HC | MAA | 9 | 430 | 130 | 120 |
| 30 | A701 | EA | 9 | 100 | 50 | 30 |
| 31 | A702 | EA | 19 | 60 | 80 | 120 |
| 32 | Tx8030 | EA/MAH | 12/3 | 170 | 200 | 90 |
| 33 | Lx4110 | EA/MAH | 6/3 | 220 | 150 | 60 |

TABLE 6-continued

| Ex | Face Layer[1] | Co-monomer | Amt[2] | Release Force[3] RT | 5° C. | Pop Off[3] |
|---|---|---|---|---|---|---|
| I[4] | — | — | — | 200 | 60 | <30 |

[1]WD201, CM8013, CM8014, WH202, CM2005, Tx8030, and Lx4110 are available from Sumitomo Chemical Co., Ltd. N0903HC, A701, and A702 are available from DuPont-Mitsui Polychemicals Co., Ltd. A201M is available from Mitsubishi Petrochemical Co., Ltd.
[2]Weight percent of indicated comonomer(s).
[3]In grams/25 mm-width. Testing at 5° C. done at a crosshead speed of 105 inches/minute (267 cm/minute).
[4]Comparative Example 1 was 0.125 mm polyethylene liner having a 0.0127 mm blend of high and low density polyethylene, 0.1 mm of high density polyethylene, and 0.0127 mm of low density polyethylene. Polyethylenes are available as Chemplex 6109 from Quantum Chemical Corp. and Exxon 138.13 from Exxon Chemical, Corp.

EXAMPLES 34-46

Release liners were made as described in Example 24 except that the release layer was a mixture of various ethylene copolymers as shown in Table 7. Examples 34 and 35 have Hz5000SF as the middle layer and F022NH as the third layer. Examples 36-39, 45, and 46 have the same middle and third layers as described in Example 24. Examples 40-44 have as a middle layer a 40/60 blend of Hz5000SF/Z322. The Z322 is available from Ube Industries, Ltd.

TABLE 7

| Ex | Face Layer Components | Comonomer[1] MMA | EA | MAH | AA | MAA | Release[2] RT | 5° C. | Pop Off |
|---|---|---|---|---|---|---|---|---|---|
| 34 | WD201/WH202 (55/45) | 14.5 | — | — | — | — | 120 | 80 | 30 |
| 35 | CM8014/WH202 (55/45) | 18.6 | — | — | — | — | 100 | 110 | 90 |
| 36 | WH202/Tx8030 (95/5) | 19.0 | 0.6 | 0.15 | — | — | 90 | 100 | 120 |
| 37 | WH202/Tx8030 (90/10) | 18.0 | 1.2 | 0.3 | — | — | 100 | 100 | 90 |
| 38 | WH202/Tx8030 (40/60) | 8.0 | 7.2 | 1.8 | — | — | 150 | 180 | 90 |
| 39 | CM2005/Tx8030 (40/60) | 10.0 | 7.2 | 1.8 | — | — | 140 | 180 | 90 |
| 40 | WH202/A201M (42.9/57.1) | 8.6 | — | — | 4.0 | — | 230 | 110 | 60 |
| 41 | CM2005/A201M (42.9/57.1) | 10.7 | — | — | 4.0 | — | 200 | 130 | 60 |
| 42 | WH202/N0903HC (55.6/44.4) | 11.1 | — | — | — | 4.0 | 150 | 120 | 60 |
| 43 | CM2005/N0903HC (55.6/44.4) | 13.9 | — | — | — | 4.0 | 160 | 130 | 60 |
| 44 | CM2005/N0903HC (22.2/77.8) | 5.6 | — | — | — | 7.0 | 260 | 130 | 120 |
| 45 | CM2005/VL102[3] (80/20) | 20.0 | — | — | — | — | 100 | 120 | 120 |
| 46 | CM2005/VL102 (60/40) | 14.5 | — | — | — | — | 110 | 110 | 90 |

[1]Weight percentage of indicated comonomer(s).
[2]In grams/25 mm-width. Testing at 5° C. done at 102 inches/minute (267 cm/minute).
[3]VL102 is available from Sumitomo Chemical Co., Ltd.

EXAMPLE 47

A release liner was made by co-extruding a 0.021 mm. thick layer of Tx8030, a 0.104 mm thick layer of polyethylene as the middle layer, and a 0.025 mm thick layer of an ethylene methylmethacrylate/polyethylene blend (EMMA-PE). The EEAMAH had an ethylacrylate-maleic anhydride content of 15 weight percent. The polyethylene layer is a 40/60 blend of Hz5000SF high density polyethylene and B128 low density polyethylene. The third layer was F022NH low density polyethylene.

The liner was tested for −40° C. shock resistance and −40° C. liner adhesion. It passed the shock resistance test, and the 180 degree and 360 degree twist test. During the loop phase, some slight bridging was observed.

EXAMPLE 48

This release liner was made as in Example 24 except that the release surface was an 80/20 blend of A201M and Ax8390. Ax8390 is an ethylene ethylacrylate maleic anhydride having a 32 weight percent ethylacrylate maleic anhydride content.

Similar results were obtained as in Example 47.

Various modifications and alterations of this invention will become apparent to those skilled in the art without departing from the scope and spirit of this invention.

What is claimed is:

1. A flexible release liner comprising (1) a support sheet having two major surfaces and (2) a face layer on one of said major surfaces that is continuous and comprises one or more of the following: a copolymer of ethylene and at least one polar comonomer, or a copolymer of propylene and at least one polar comonomer, or blends of such copolymers, wherein said support sheet and said face layer are substantially free of migratory plasticizers and silicones.

2. The release liner of claim 1 wherein said support sheet has a tensile force of at least about 0.2 pounds/inch-width at an elongation of about 1 percent.

3. The release liner of claim 1 wherein said support sheet has a tensile force of at least about 0.5 pounds/inch-width at an elongation of about 1 percent.

4. The release liner of claim 1 wherein said support sheet has an elongation of at least about 5 percent.

5. The release liner of claim 1 wherein said support sheet has an elongation of at least about 10 percent.

6. The release liner of claim 1 wherein said support sheet has an elongation of at least about 20 percent.

7. The release liner of claim 6 wherein said support sheet has a tensile force of at least about 2 pounds/inch-width at an elongation of about 20 percent.

8. The release liner of claim 1 wherein said support sheet comprises one or more of the following: nylon, polypropylene, polyethylene, polyester, acrylic or cellulosic derivative.

9. The release liner of claim 1 wherein said support sheet comprises at least one of the following: a continuous film, a non-woven web, a knit web, or a woven web.

10. The release liner of claim 9 wherein said support sheet comprises a non-woven web.

11. The release liner of claim 10 wherein said support sheet has a tensile force of at least about 2 pounds/inch-width at an elongation of about 20 percent.

12. The release liner of claim 1 wherein said support sheet has a thickness of between about 2 and about 15 mils.

13. The release liner of claim 1 wherein said face layer comprises at least one copolymer of ethylene or propylene with at least one of the following: methylmethacrylate, methylacrylate, ethylacrylate, acrylic acid, methacrylic acid, butyl acrylate, vinyl acetate, or maleic anhydride.

14. The release liner of claim 1 wherein said face layer comprises a copolymer of ethylene and vinyl acetate.

15. The release liner of claim 1 further comprising a friction-enhancing agent on the major surface of said support sheet opposite the major surface on which said face layer is on.

16. The release liner of claim 1 wherein said release liner is at least partially light transmissive.

17. The release liner of claim 1 wherein said release liner contains one or more coloring agents.

18. The release liner of claim 1 applied to a pressure-sensitive adhesive layer of an article.

19. A foam tape comprising a foam layer, a layer of pressure-sensitive adhesive, and a release liner of claim 1 applied to said layer of adhesive.

* * * * *

UNITED STATES PATENT AND TRADEMARK OFFICE
CERTIFICATE OF CORRECTION

PATENT NO. : 5,167,995
DATED : December 1, 1992
INVENTOR(S) : Michael A. Johnson et al.

It is certified that error appears in the above-identified patent and that said Letters Patent is hereby corrected as shown below:

Title page: Item [75] Inventors:, the respective residences of the inventors should read as follows:

--Michael A. Johnson, Stillwater, Minnesota; Milton R. Gates, New Hope, Minnesota; Norihito Shibahara, Sagamihara, Japan--

Signed and Sealed this

Sixteenth Day of November, 1993

Attest:

BRUCE LEHMAN

Attesting Officer

Commissioner of Patents and Trademarks